United States Patent [19]
Löffler et al.

[11] Patent Number: 5,549,184
[45] Date of Patent: Aug. 27, 1996

[54] HYDRODYNAMIC CONVERTER WITH A BRIDGING COUPLING

[75] Inventors: Alfons Löffler; Josef Schwarz, both of Friedrichshafen, Germany

[73] Assignee: ZF Friedrichshafen AG, Germany

[21] Appl. No.: 374,515

[22] PCT Filed: Jul. 21, 1993

[86] PCT No.: PCT/EP93/01925

§ 371 Date: Jan. 18, 1995

§ 102(e) Date: Jan. 18, 1995

[87] PCT Pub. No.: WO94/02759

PCT Pub. Date: Feb. 3, 1994

[30] Foreign Application Priority Data

Jul. 24, 1992 [DE] Germany .............. 42 24 472.2

[51] Int. Cl.⁶ .................................................. F16H 61/14
[52] U.S. Cl. .................... 192/3.3; 192/85 R; 192/109 F
[58] Field of Search .......................... 192/3.29, 3.3, 192/85 R, 109 F; 74/732.1

[56] References Cited

U.S. PATENT DOCUMENTS

| | | | |
|---|---|---|---|
| 2,965,202 | 12/1960 | Christenson | 192/3.3 |
| 3,683,618 | 8/1972 | Schacher et al. | 192/85 R X |
| 3,949,847 | 4/1976 | Hoehn | 192/109 F X |
| 4,880,091 | 11/1989 | Hasegawa et al. | 192/3.3 |
| 5,163,540 | 11/1992 | Mainquist et al. | 192/3.3 |

FOREIGN PATENT DOCUMENTS

| | | |
|---|---|---|
| 2109826 | 5/1972 | France . |
| 3130871 | 3/1982 | Germany . |
| 3433333 | 5/1985 | Germany . |
| 3445743 | 6/1986 | Germany . |
| 3543013 | 6/1987 | Germany . |
| 3818102 | 12/1988 | Germany . |
| 3915186 | 8/1990 | Germany . |

OTHER PUBLICATIONS

Patent Abstracts of Japan vol. 015, No. 129 (M-1098) 28 Mar. 1991 & JP, A, 03 014 965 (Mazda Motor Corp.) 23 Jan. 1991 see abstract.

Patent Abstracts of Japan vol. 013, No. 014 (M-784) 13 Jan. 1989 (Toyota Motor Corporation) see abstract.

*Primary Examiner*—Richard M. Lorence
*Attorney, Agent, or Firm*—Davis, Bujold & Streck

[57] ABSTRACT

A bridging coupling is actuated by an annular piston to which the converter's internal pressure is applied on one side thereof in an opening direction and a closing pressure is applied in the closing direction. The closing pressure is controlled by a precontrolled regulating valve depending on the output pressure of the converter and on a control pressure that depends upon further operating parameters. With the coupling open, the closing pressure in the closing pressure chamber remains below the internal pressure of the converter by a specified value. This ensures that the bridging coupling responds quickly and can be precisely regulated within narrow tolerances. In addition, only relatively little power is needed for the regulation.

4 Claims, 1 Drawing Sheet

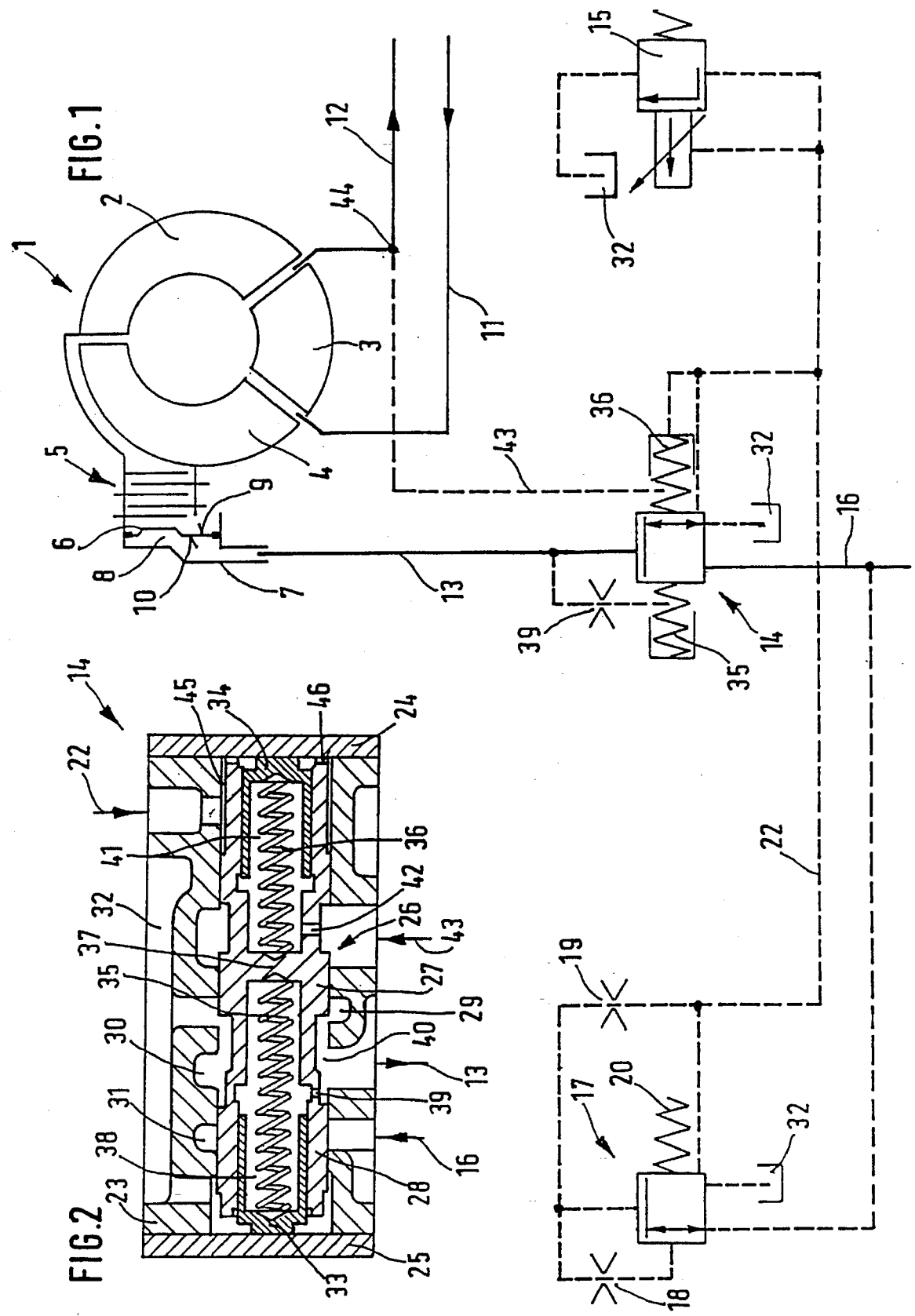

HYDRODYNAMIC CONVERTER WITH A BRIDGING COUPLING

The invention concerns a hydrodynamic converter according to the preamble of claim 1.

A hydrodynamic converter of that kind has been disclosed in DE-C1 39 15 186. In this kind it is advantageous that the converter's internal pressure is not dependent on the actuating pressure of the bridging coupling which is hydraulically actuated by an annular piston, but that the actuating pressure acts upon the annular piston in opposition to the converter's internal pressure and is controlled depending on the converter's internal pressure so as to form, from the converter intake pressure and the converter discharge pressure, a reference control pressure which acts upon a precontrolled regulating valve. The latter for its part is pressurized by a coupling control valve which, depending on the turbine speed and on the output speed of the transmission, connects a controlled pressure-fluid pipe with a main pressure pipe or a zero terminal. Thereby the actuating pressure drops to zero when the bridging coupling is open.

To be able to quickly apply closing pressure to the annular piston, a by-pass control valve is provided which makes possible an unthrottled connection to the closing-pressure chamber.

A hydrodynamic converter has also been disclosed in DE-C2 31 30 871 where a bridging coupling is pressurized in the closing direction by the converter's internal pressure. The latter is thus equal to the closing pressure and thus dependent thereon. The intake pressure of the pressurized fluid to the converter is adjusted depending on the suction pressure and the speed of a driving engine, which is the same as on the output speed and lube oil temperature. Since the converter's internal pressure changes with the load condition of the converter, temperature, viscosity, and depends on manufacturing tolerances, different closing pressures appear according to operating ratios despite an equal intake pressure.

Departing from said prior art, the invention is based on the problem of providing a hydrodynamic converter of the kind described above where, with a small expenditure of energy, the bridging coupling can be quickly and accurately controlled over broad operating ranges. According to the invention the problem is solved by the features stated in the characteristic part combined with the features of the preamble of claim 1.

According to the invention, the closing pressure of the coupling is not lowered to zero, but only by a given value so as to be lower than the converter's internal pressure and to sufficiently open the coupling. Thereby, the closing-pressure chamber on the annular piston is filled with pressurized fluid so that the bridging coupling quickly responds with a relatively small supply of fluid when again switched on.

Since the closing pressure is regulated depending on the converter's internal pressure, changes caused by the operation and manufacturing tolerances that appear in series production are taken into account and, to a great extent, automatically compensated for. The presettable pressure difference can be determined by the design of the regulating springs. Said difference is thus not dependent on the converter's variable internal pressure.

Since the internal pressure of the converter is difficult to detect, as such, other reference pressures can be used for the regulation, such as a reference control pressure formed by the converter intake pressure and the converter discharge pressure, or only the output pressure of the converter which gives a good approximation.

In many cases, for reasons of comfort and in order to dampen oscillations, it is not enough to switch on the bridging coupling with the same closing pressure under all operating conditions. Therefore, according to an embodiment of the invention, it is proposed that both the output pressure of the converter and a control pressure that is modulated in accordance with other operating parameters act as a precontrol pressure upon the precontrolled regulating valve. Said operating parameters are, among others, the engine speed, the output speed, the input torque, temperature of operating means and of the environment, the inclination of the road, transverse movements, steering angles, brake pressure, etc. Together with said direct operating parameters, there obviously can be used adequately measured or calculated reference parameters, the same as the nth function thereof after the time, n being an integer between one and infinite. As a precontrol pressure the output pressure of the converter takes care that there exists a pressure difference between the closing pressure and the converter's internal pressure that is sufficient for the opening position, while the control pressure, modulated by the other operating parameters, raises the closing pressure until the bridging coupling slips or completely closes according to the presence of the operating parameters.

A regulating valve according to claim 3 is specially suited as a precontrolled regulating valve. The pressure-actuated active surfaces are coordinated with the valve springs in such a manner that, when the bridging coupling is disconnected, the closing pressure is less by a certain value than the output pressure and that, at the start of the torque transmission, the closing pressure is equal to the output pressure of the converter.

In order to be able to modulate the control current over a wide operating range depending on other operating parameters without large control currents resulting and causing a corresponding loss of energy, there is provided in another embodiment of the invention a constant flow valve which constantly keeps the flow of the modulated control pressure pressurized-medium at a low level, thus keeping small the losses by leakage.

Combinations of features for the solution of the stated problem are given in the claims. In view of the specification, the expert will easily consider other convenient combinations of features for solving the stated problem.

An embodiment of the invention is shown in the drawings.

FIG. 1 diagrammatically shows the construction of a hydrodynamic converter with the control thereof;

FIG. 2 shows a longitudinal section through a precontrolled regulating valve according to FIG. 1.

The hydrodynamic converter 1 has a pump 2 operatively connected with a driving engine, not shown in detail, a stator 3 and a turbine 4. Converters of this construction are widely distributed and generally known to the expert.

A bridging coupling 5, that is actuated by an annular piston 6, is situated between the turbine 4 and the pump 2. The bridging coupling 5 includes a pump housing 7 with a closing-pressure chamber 8.

The converter 1 is supplied with pressurized fluid via a feed pipe 11 and a discharge pipe 12. According to the pressure in the feedpipe 11 and the pressure at the exit of the converter 1, i.e. the output pressure, there is generated in the converter 1, depending on the operating conditions, temperature, viscosity of the operating means and on the manufacturing tolerances, an internal converter pressure which also actuates a first active surface 9 of the annular piston 6. A closing pressure acts upon a second active surface 10 of the annular piston 6 via a pressure pipe 13. The closing pressure is regulated by a precontrolled regulating valve 14 depending on the output pressure of the converter 1 and on a control pressure that is modulated by other operating parameters, which pressures are applied to the regulating valve 14 as precontrol pressures. The control pressure is modulated depending on the operating parameters by means of an electromagnetically actuatable pressure-control valve 15 which is controlled in a usual manner by an electronic evaluation unit not shown. The control current is branched off from a main pressurized-fluid pipe 16 and kept constant in the mutual design by a constant flow valve 17. The constant flow valve 17 contains a damping throttle 18 and a constant throttle 19. The pressure drop in the constant throttle 19 is determined by a regulating spring 20 of the constant flow valve 17. The constantly regulated pressure drop on the fixed throttle 19 causes a constant flow of pressurized fluid in a control pipe 22 which leads to the pressure control valve 15.

The regulating valve 14 comprises a valve housing 23 with cover plates 24 and 25. A slide valve 26 is axially movably received in the valve housing 23. The slide valve 26 has control collars 27 and 28 which interact with control ports 29, 30 and 31. The control port 31 communicates with the main pressurized-fluid pipe 16, the control port 30 with the pressurized-fluid pipe 13, which leads to the closing-pressure chamber 8, and the control port 29 with a sump 32.

Two identical pistons 33 and 34 are coaxially received in the slide valve 26. The first piston 33 is biased by a first regulating spring 35 against the cover plate 25 and the second piston 34 is biased by a second regulating spring 36 against the cover plate 24. A wall 37 in the slide valve 26 supports the regulating springs 35 and 36 and divides the chambers thereof from each other. The first spring chamber 38, belonging to the first regulating spring 35, is connected via a throttle bore 39 with a groove 40 between the control collars 27 and 28. The second spring chamber 41, belonging to the second regulating spring 36, permanently communicates via a bore 42 with the terminal of a control pipe 43 which leads to the exit 44 of the converter 1. The modulated pressure in the control pipe 22 acts via a groove 45 in the slide valve 26 upon the second piston 34 in opposition to the second regulating spring 36 and upon the slide valve 26 via active surface 46 surrounding the second piston.

At the beginning of the operation, the slide valve 26 is in the indicated position, because the first regulating spring 35 is designed stronger than the second regulating spring 36 and the pressure acting upon the front faces is zero or very weak. As the pressure rises at the exit 44 of the converter, so rises the pressure in the second spring chamber 41 and the slide valve 26 is moved to the left against the force of the first regulating spring 35 so as to connect the pressurized-fluid pipe 16 with the pressurized-fluid pipe 13 via the groove 40. At the same time, via the throttle bore 39 in the first spring chamber 38, the pressure of the pressurized-fluid pipe 13 acts upon the slide valve 26. If the active surfaces in the spring chambers 38 and 39 are equal, the slide valve 26 again closes the main pressurized-fluid pipe as soon as the pressure in the pressurized-fluid pipe 13 plus the spring tension of the first regulating spring 35 are equal to the pressure at the exit 44 of the converter 1 plus the spring tension of the second regulating spring 36 and the control pressure in the pipe 22. The control pressure and the difference of the spring tensions of the regulating springs 35 and 36 result in a pressure differential by which the pressure in the pressure pipe 13 is less than in the control pipe 43. Said pressure differential is always retained in accordance with the current operating situation independently of how the output pressure changes.

If the bridging coupling 6 is now closed, the closing pressure in the pressurized-fluid pipe 13 is increased by the control pressure in the control pipe 22 being increased by the pressure-control valve 15 depending on further operating parameters. This control pressure acts upon the slide valve 26 in the sense that the pressurized-fluid pipe 13 is connected with the main pressurized-fluid pipe 16 until a correspondingly higher closing pressure has appeared.

If the pressure at the exit 44 of the converter 1 diminishes or the control pressure in the control-pressure pipe 22 is reduced, the pressurized-fluid pipe 13 becomes connected with the sump until a desired pressure difference between the closing pressure and the converter internal pressure has again appeared. Thereby it is possible to regulate the closing forces of the bridging coupling 6 within narrow tolerances independently of dispersions in series production, and to quickly adapt them to the current operation requirements with a simple control means. Only very little pressurized fluid is needed for control of the bridging coupling 6, since the closing-pressure chamber 8 always remains filled and the closing pressure is kept at a presettable level below the internal pressure of the converter 1 when the bridging coupling is open. Starting from said level, the pressure-control valve 15 governs. Therefore, it can be designed for a small range of control between the maximum and minimum closing pressure to be regulated and additionally corresponding to the pressure differential.

According to the invention it is proposed to control a bridging coupling so as to lower the closing pressure of the coupling to a presettable value. This value is below a threshold at which the coupling closes. It is thus ensured that the coupling remains open. The closing-pressure chamber of the coupling remains filled with a predetermined amount of pressurized fluid. Only a relatively small amount of additional fluid is required to raise the closing pressure above the threshold and close the coupling. Thus, the coupling can quickly respond with a relatively small supply of fluid.

A corresponding control is also possible for other types of couplings.

The term coupling is to be understood herebelow to mean any kind of releasable connection, such as gear clutches, that can be closed or opened by feeding pressurized pneumatic or hydraulic fluid thereto.

In couplings of that kind the closing pressure is lowered in the same manner, for instance, when the coupling is opened. The opening pressure can also be accordingly lowered when the coupling is closed. Precisely enough fluid remains in the actuation pressure chamber of the coupling, so that the coupling does not change its present shifting condition. It is ensured that the remaining amount of fluid securely keeps the coupling in the actual shifting condition.

If the shifting condition of the coupling is changed, only a relatively small amount of additional fluid is then needed to engage the coupling. A quick response of the coupling is thereby obtained.

| Reference numerals | |
|---|---|
| 1 | converter |
| 2 | pump |
| 3 | stator |
| 4 | turbine |
| 5 | bridging coupling |
| 6 | annular piston |
| 7 | pump housing |

| Reference numerals | |
|---|---|
| 8 | closing-pressure chamber |
| 9 | first active surface |
| 10 | second active surface |
| 11 | feedpipe |
| 12 | discharge pipe |
| 13 | pressurized-fluid pipe |
| 14 | regulating valve |
| 15 | pressure-control valve |
| 16 | main pressurized-fluid pipe |
| 17 | constant flow valve |
| 18 | damping throttle |
| 19 | constant throttle |
| 20 | regulating spring |
| 21 | — |
| 22 | control pipe |
| 23 | valve housing |
| 24 | cover plate |
| 25 | cover plate |
| 26 | slide valve |
| 27 | control collar |
| 28 | control collar |
| 29 | control collar |
| 30 | control port |
| 31 | control port |
| 32 | sump |
| 33 | first piston |
| 34 | second piston |
| 35 | first regulating spring |
| 36 | second regulating spring |
| 37 | wall |
| 38 | first spring chamber |
| 39 | throttle bore |
| 40 | groove |
| 41 | second spring chamber |
| 42 | bore |
| 43 | control pipe |
| 44 | exit of the converter |
| 45 | groove |
| 46 | active surface |

We claim:

1. A hydrodynamic converter (1) including a bridging coupling (5) that is actuated by an annular piston (6) whose first active surface (9) is actuated in an opening direction by an internal pressure of said converter (1) and whose second active surface (10) is actuated in a closing direction by a closing pressure, wherein during a closing and in a closed condition of said bridging coupling (5) a precontrolled regulating valve (14) adjusts the closing pressure to a value above the internal pressure of said converter (1), wherein during an opening phase of said bridging coupling (5) said precontrolled regulating valve (14) keeps the closing pressure greater than zero and below the internal pressure of said converter (1) by a presettable value.

2. A hydrodynamic converter according to claim 1, wherein both an output pressure of said converter (1) and a control pressure modulated in accordance with other operating parameters act as a precontrol pressure upon said precontrolled regulating valve (14).

3. A hydrodynamic converter according to claim 2, wherein said regulating valve (14) has, in a valve housing (23), a slide valve (26) with control collars (27, 28), there being two pistons (33, 34) coaxially received in said slide valve (26) that are spring biased toward front faces thereof and the modulated control pressure is applied to the second piston (34) on a front side thereof and the output pressure of said converter (1) on a spring side thereof, forces acting upon said pistons on the front side being always weaker than forces acting on said pistons on the spring side, said first piston (33) having, via a throttle bore (39), the closing pressure applied thereto and being connected on the front side with a sump (32), and active surfaces on said slide valve (26) and said regulating springs (35, 36) are coordinated in such a manner that in a lowest modulated control pressure the internal pressure of said converter (1) exceeds the closing pressure by a specific value.

4. A hydrodynamic converter according to claim 1, wherein a constant flow valve (17) constantly keeps the pressurized-fluid flow of the modulated control pressure at a presettable level.

* * * * *